US010390287B2

(12) United States Patent
Nishimura et al.

(10) Patent No.: US 10,390,287 B2
(45) Date of Patent: Aug. 20, 2019

(54) RESTRICTION CONTROL APPARATUS, RESTRICTION CONTROL SYSTEM, AND RESTRICTION CONTROL METHOD

(71) Applicant: NTT DOCOMO, INC., Tokyo (JP)

(72) Inventors: Masaki Nishimura, Tokyo (JP); Keisuke Suzuki, Tokyo (JP); Reika Higa, Tokyo (JP); Keisuke Sasada, Tokyo (JP); Dirk Staehle, Munich (DE); Srisakul Thakolsri, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/116,573

(22) Filed: Aug. 29, 2018

(65) Prior Publication Data

US 2018/0376404 A1    Dec. 27, 2018

Related U.S. Application Data

(63) Continuation of application No. 15/125,806, filed as application No. PCT/JP2015/056842 on Mar. 9, 2015.

(30) Foreign Application Priority Data

Mar. 14, 2014   (JP) ................................. 2014-051558

(51) Int. Cl.
    *H04W 4/08*      (2009.01)
    *H04W 48/02*     (2009.01)
    (Continued)

(52) U.S. Cl.
    CPC ............. *H04W 48/02* (2013.01); *H04W 4/08* (2013.01); *H04W 8/186* (2013.01); *H04W 4/70* (2018.02)

(58) Field of Classification Search
    CPC ........ H04W 60/00; H04W 60/06; H04W 8/02
    (Continued)

(56) References Cited

U.S. PATENT DOCUMENTS 6,871,069 B1   3/2005   Cho
8,135,120 B2   3/2012   Yasuda
(Continued)

FOREIGN PATENT DOCUMENTS

JP    2006-345580 A    12/2006
JP    2010-093508 A    4/2010
(Continued)

OTHER PUBLICATIONS

International Search Report issued in PCT/JP2015/056842 dated Apr. 28, 2015 (1 page).

(Continued)

*Primary Examiner* — Joshua L Schwartz
(74) *Attorney, Agent, or Firm* — Osha Liang LLP (57) ABSTRACT

A restriction control apparatus configured to perform restriction control of communication of a user apparatus in a mobile communication system includes an information obtaining unit configured to obtain, from a user information management apparatus in the mobile communication system, group identification information indicating a group to which the user apparatus belongs, and a restriction determination unit configured, when receiving a communication request from the user apparatus, to determine whether the group to which the user apparatus belongs is a control target or not based on the group identification information and group identification information of a control target determined by the restriction control apparatus.

2 Claims, 8 Drawing Sheets

(51) Int. Cl.
*H04W 8/18* (2009.01)
*H04W 4/70* (2018.01)
(58) Field of Classification Search
USPC ...................................................... 455/452.1
See application file for complete search history.

(56) References Cited

U.S. PATENT DOCUMENTS

| 9,226,222 | B2 | 12/2015 | Zhou et al. | |
|---|---|---|---|---|
| 2010/0014652 | A1 | 1/2010 | Yasuda | |
| 2011/0199905 | A1* | 8/2011 | Pinheiro | H04W 28/0215 370/235 |
| 2013/0227138 | A1* | 8/2013 | Cai | H04W 12/08 709/225 |
| 2016/0073281 | A1 | 3/2016 | Zhou et al. | |

FOREIGN PATENT DOCUMENTS

| JP | 2010-232811 A | 10/2010 |
|---|---|---|
| JP | 4826676 B2 | 11/2011 |
| JP | 2013-520100 A | 5/2013 |
| JP | 2013-526160 A | 6/2013 |

OTHER PUBLICATIONS

Written Opinion of the International Searching Authority issued in PCT/JP2015/056842 dated Apr. 28, 2015 (4 pages).
3GPP TS 23.682 V115.0; "3rd Generation Partnership Project; Technical Specification Group Services and System Aspects; Architecture enhancements to facilitate communications with packet data networks and applications (Release 11)"; Sep. 2013 (29 pages).
3GPP TS 23.401 V11.5.0; "3rd Generation Partnership Project; Technical Specification Group Services and System Aspects; General Packet Radio Service (GPRS) enhancements for Evolved Universal Terrestrial Radio Access Network (E-UTRAN) access; (Release 11)"; Mar. 2013 (286 pages).
3GPP TS 23.060 V11.5.0; "3rd Generation Partnership Project; Technical Specification Group Services and System Aspects; General Packet Radio Service (GPRS); Service description; Stage 2 (Release 11)"; Mar. 2013 (335 pages).
3GPP TS 23.060 V124.0; "3rd Generation Partnership Project; Technical Specification Group Services and System Aspects; General Packet Radio Service (GPRS); Service description; Stage 2 (Release 12)"; Mar. 2014 (345 pages).
3GPP TS 23.401 V12.4.0; "3rd Generation Partnership Project; Technical Specification Group Services and System Aspects; General Packet Radio Service (GPRS) enhancements for Evolved Universal Terrestrial Radio Access Network (E-UTRAN) access (Release 12)"; Mar. 2014 (302 pages).
Office Action issued in the counterpart Japanese Patent Application No. 2014-051558, dated Aug. 30, 2016 (7 pages).
Sierra Wireless; "23.888 MTC access control by RAN clean up"; 3GPP TSG SA WG2 Meeting #80, TD S2-103759; Brunstad, Norway; Aug. 30-Sep. 3, 2010 (4 pages).
Decision to grant a patent issued in corresponding Japanese Application No. 2014-051558, dated Nov. 22, 2016 (6 pages).
Extended European Search Report issued in corresponding European Application No. 15762025.3, dated Jan. 19, 2017 (11 pages).
3GPP TR 23.888 V1.2.0; "3rd Generation Partnership Project; Technical Specification Group Services and System Aspects; System Improvements for Machine-Type Communications (Release 11)"; Apr. 2011 (111 pages).
Office Action issued in the counterpart European Patent Application No. 15762025.3, dated Sep. 18, 2017 (10 pages).
Office Action issued in the counterpart European Patent Application No. 15762025.3, dated Feb. 7, 2018 (12 pages).
Office Action issued in the counterpart Chinese Patent Application No. 201580012737.8, dated Feb. 24, 2018 (16 pages).
Office Action issued in the counterpart Chinese Patent Application No. 201580012737.8, dated Oct. 8, 2018 13 pages).

* cited by examiner

| USER ID | M2M GROUP ID |
|---------|--------------|
| 1 | 1 |
| 2 | 1 |
| 3 | 2 |
| ⋮ | ⋮ |

RESTRICTION CONTROL APPARATUS, RESTRICTION CONTROL SYSTEM, AND RESTRICTION CONTROL METHOD

CROSS REFERENCE TO RELATED APPLICATIONS

This application is a continuation application of U.S. patent application Ser. No. 15/125,806, filed on Sep. 13, 2016, which is the U.S. national stage of PCT Application No. PCT/JP2015056842, filed on Mar. 9, 2015, which claims priority to Japanese Patent Application No. 2014-051558, filed on Mar. 14, 2014. The entire content of these applications are incorporated herein by reference.

TECHNICAL FIELD

The present invention relates to a technique for restricting communication of a user apparatus (terminal) in a mobile communication.

BACKGROUND

In recent years, study of M2M (Machine-to-Machine) communication is progressing in which communication is executed between machines that are connected to a communication network without operation by a human so that proper control of machines and the like are automatically performed. For example, in 3GPP, standardization of a communication standard on M2M is progressing as a name of MTC (Machine Type Communication) (for example: non-patent document 1).

From now, it is predicted that M2M terminals and the like will become widespread at an accelerated pace. In a network accommodating these large amount of terminals, for example, since there is a possibility in that congestion may occur due to re-connection, caused by network apparatus failure or server failure or the like, that is simultaneously performed by the large amount of M2M terminals, necessity of congestion control different from that of general terminals is being discussed in standardization and the like.

As such a congestion control technique, in 3GPP, a technique is proposed in which, communication is classified into non-priority (low priority) and general (normal priority), and LAPI (Low Access Priority Indicator) which indicates non-priority is set to an M2M terminal that is positioned as non-priority, so as to perform congestion control based on the LAPI (for example, non-patent documents 2, 3 and the like). By introducing the LAPI, for example, congestion control becomes available in which, when congestion occurs, communications of general terminals are prioritized and only LAPI terminals are restricted.

RELATED ART DOCUMENT

Non Patent Document

[NON PATENT DOCUMENT 1] 3GPP TS 23.682 v11.5.0
[NON PATENT DOCUMENT 2] 3GPP TS 23.401 v11.5.0
[NON PATENT DOCUMENT 3] 3GPP TS 23.060 v11.5.0

SUMMARY OF THE INVENTION

In the above-mentioned conventional technique, it is possible to perform, for M2M terminals, restriction different from that for general terminals. However, all of M2M terminals do not necessarily support LAPI, so restriction control for M2M may not be able to be performed for LAPI-not-supported terminals that do not set LAPI. Also, in the conventional technique, only uniform restriction can be performed for LAPI supported terminals, so flexible restriction control such as restriction only to communication of a group of terminals that access a specific server may not be able to be performed, for example.

In contrast, one or more embodiments of the present invention provide a technique for performing flexible restriction control for a user apparatus irrespective of whether the user apparatus supports LAPI or not.

According to one or more embodiments of the present invention, there is provided a restriction control apparatus configured to perform restriction control of communication of a user apparatus in a mobile communication system, including:

an information obtaining unit configured to obtain, from a user information management apparatus in the mobile communication system, group identification information indicating a group to which the user apparatus belongs; and a restriction determination unit configured, when receiving a communication request from the user apparatus, to determine whether the group to which the user apparatus belongs is a control target or not based on the group identification information and group identification information of a control target designated from an operation system.

According to one or more embodiments of the present invention, there is provided a restriction control system including the restriction control apparatus and a radio access control apparatus in the mobile communication system, the radio access control apparatus including:

a determination unit configured, when receiving a connection request including group identification information from a user apparatus, to determine whether a group to which the user apparatus belongs is a control target or not based on the group identification information and a group identification information of a control target designated from the operation system.

According to one or more embodiments of the present invention, there is provided a restriction control method in a mobile communication system that includes a restriction control apparatus configured to perform restriction control of communication of a user apparatus, and includes a user information management apparatus, wherein the user information management apparatus holds group identification information indicating a group to which a user apparatus belongs for each user apparatus, the restriction restriction control apparatus obtains group identification information from the user information management apparatus, and when the restriction control apparatus receives a communication request from the user apparatus, the restriction control apparatus determines whether the group to which the user apparatus of a transmission source of the communication request belongs is a control target or not based on the group identification information of the user apparatus obtained from the user information management apparatus and group identification information of a control target designated from an operation system.

According to one or more embodiments of the present invention, there is provided a technique that enables flexible restriction control for a user apparatus irrespective of whether the user apparatus supports LAPI or not.

DETAILED DESCRIPTION

In the following, embodiments of the present invention are described with reference to figures. The embodiments described below are merely examples, and the embodiments to which the present invention is applied are not limited to the embodiments below. For example, although it is assumed that the mobile communication system of the present embodiments perform M2M communication and that user apparatuses UE are M2M terminals, the control scheme of the present invention can be applied not only to M2M terminals but also to general user apparatuses UE.

(System Configuration)

Figure 1:
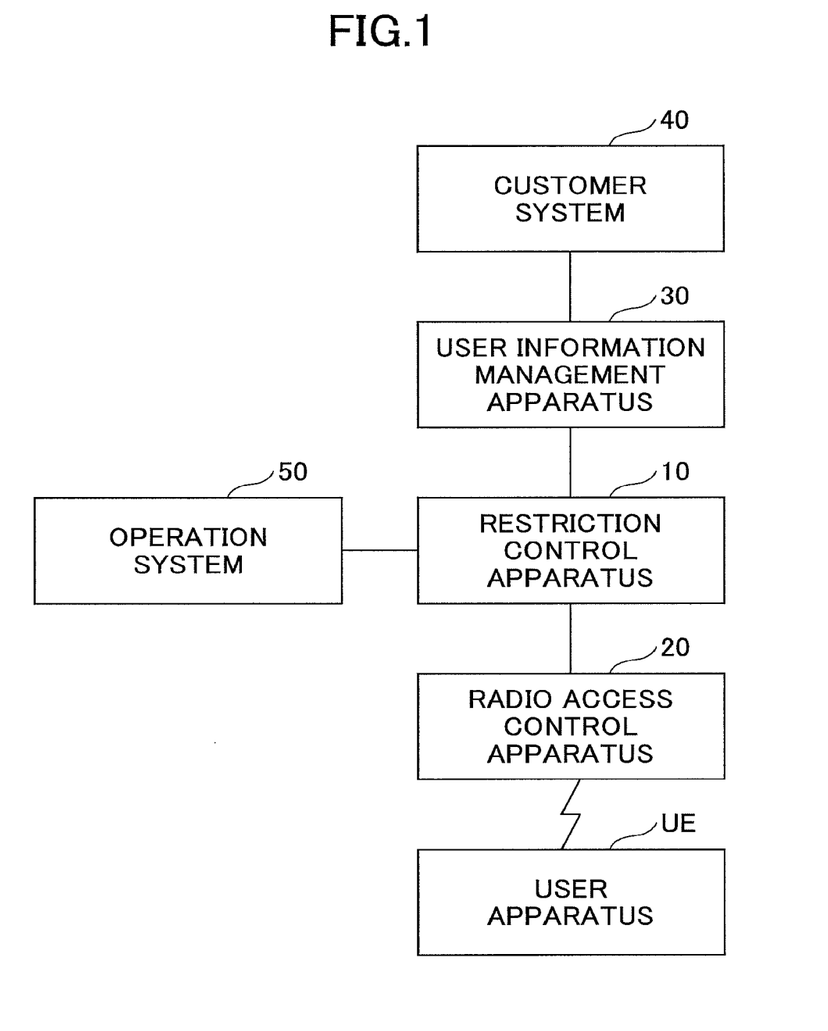
FIG. 1 is a block diagram of a communication system according to one or more embodiments of the present invention.

FIG. 1 shows a block diagram of a communication system according to one or more embodiments of the present invention. The communication system according to one or more embodiments includes a restriction control apparatus 10, a radio access control apparatus 20 and a user information management apparatus 30. Also, FIG. 1 shows a customer system 40, an operation system 50 and a user apparatus UE. FIG. 1 shows that communication is available between apparatuses connected by a line. Also, the configuration shown in FIG. 1 is a configuration common to embodiments of a first example and a second example described below.

The restriction control apparatus 10 is an apparatus configured to control restriction of communication for the user apparatus UE based on a command and the like from the operation system 50. The radio access control apparatus 20 is an apparatus configured to accept a radio access from the user apparatus UE. Especially, in the after-mentioned embodiments of the second example, the radio access control apparatus 20 is provided with a function for performing communication restriction for the user apparatus UE.

In one or more embodiments, users (that may be also referred to as subscribers) are divided into groups, in which user information of each user is assigned an M2M group ID that identifies a group. In one or more embodiments, it is possible to perform restriction control for each group. Since the customer system 40 and the like can arbitrarily assign M2M group IDs to users, flexible restriction control becomes available.

The user information management apparatus 30 holds information in which an M2M group ID is associated with a user ID (user identification information). The customer system 40 sets, to the user information management apparatus 30, information in which an M2M group ID is associated with a user ID by a service order (SO), for example. The operation system 50 transmits, to the restriction control apparatus 10, a command and the like for designating a group of a restriction target. The operation system 50 is not limited to a specific system, and it may be any system as long as it can transmit an instruction to the restriction control apparatus 10 in the operator. The operation system 50 may be referred to as an "operator". Also, in one or more embodiments, as an example, although a case is mainly described in which the restriction control apparatus 10 performs restriction control based on an instruction from the operation system 50, the restriction control apparatus 10 can also perform restriction control in accordance with its own judgement without an instruction from the operation system 50. For example, the restriction control apparatus 10 may determine whether to perform restriction control based on signal amount transmitted to a network and/or signal amount received from the network so as to perform restriction control when the restriction control is necessary.

Although the communication system according to one or more embodiments is a mobile communication system, the communication scheme is not limited to a specific communication scheme. For example, as a communication scheme, a communication scheme such as 3G, LTE (including LIE-Advanced) and the like can be used. For example, in the case where the communication scheme to apply is 3G, the restriction control apparatus 10, the radio access control apparatus 20, and the user information management apparatus 30 correspond to SGSN, RNC and HLR respectively. Also, in the case where the communication scheme to apply is LTE, the restriction control apparatus 10, the radio access control apparatus 20, and the user information management apparatus 30 correspond to MME, eNodeB and HSS respectively. However, for both 3G and LTE, correspondence is not limited to these examples, and the restriction control apparatus 10, the radio access control apparatus 20, and the user information management apparatus 30 can be also realized by node apparatuses other than the above-mentioned ones.

In the following, one or more embodiments of the first example and the second example are described in more detail.

First Example

In one or more embodiments of the first example, the restriction control apparatus 10 holds correspondence information (to be referred to as user information, hereinafter) between a user ID and an M2M group ID, and determines whether to reject or permit a communication request from a user apparatus UE based on the user information so as to realize restriction control for each group.

Figure 2:
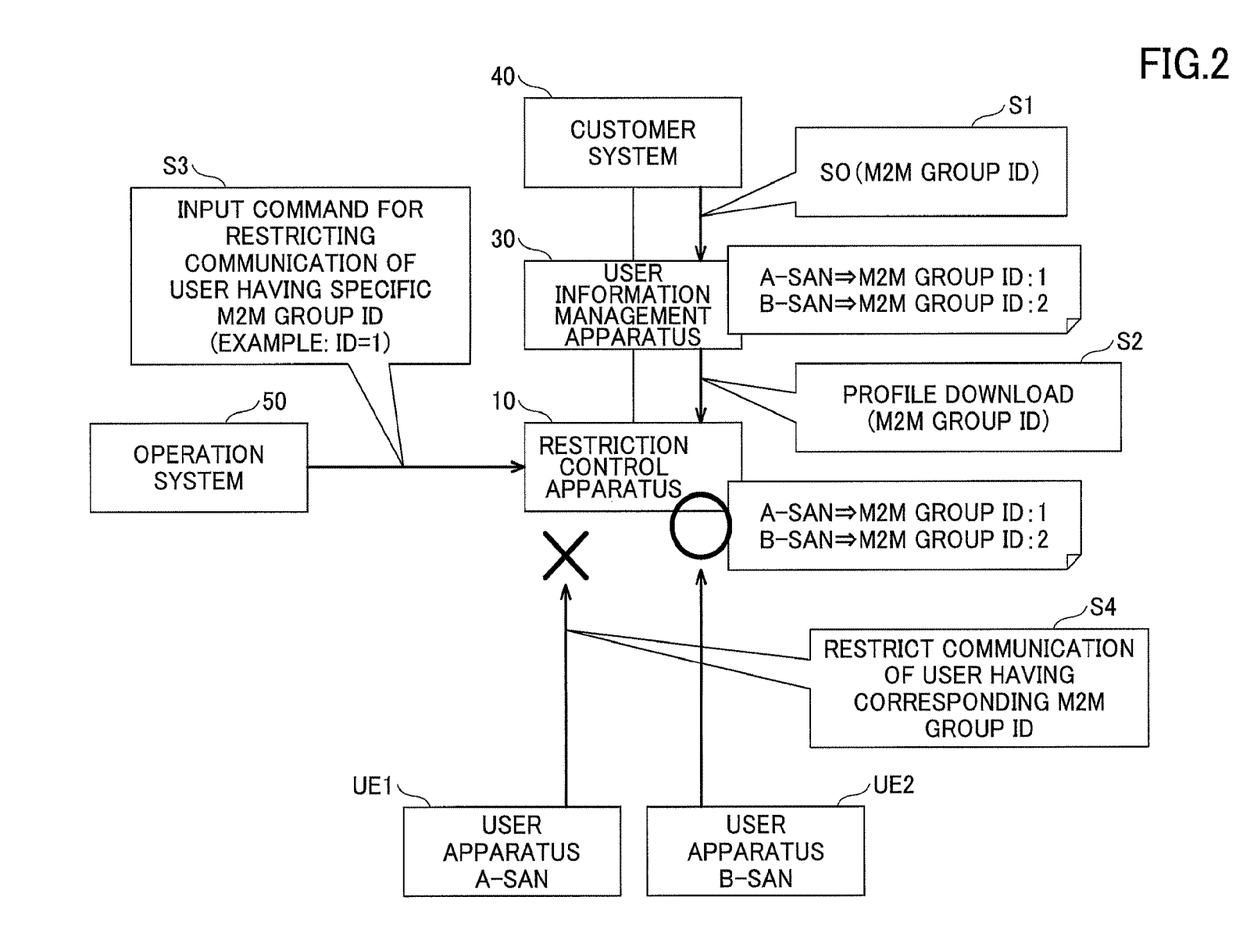
FIG. 2 is a diagram for explaining outline of processes according to one or more embodiments of a first example of the present invention.

Outline of processing in one or more embodiments of the first example is described with reference to FIG. 2. First, an M2M group ID is set for each user ID from the customer system 40 to the user information management apparatus 30 (step 1). In the example of FIG. 2, it is shown that M2M group ID1 is set to a user A (A-san), and M2M group ID2 is set to a user B (B-san).

The user information (profile) including the M2M group ID is downloaded to the restriction control apparatus 10 that accommodates the user apparatus UE of the corresponding user, and the restriction control apparatus 10 holds the user information (step 2).

For example, in a situation in which a server apparatus accessed by user apparatuses UE of a group is failed, the operation system 50 detects the event, and determines to restrict communication of user apparatuses UE belonging to the group (here, as an example, M2M group ID=1). Then, a command including the M2M group ID1 indicating an M2M group of a restriction target is transmitted from the operation system 50 to the restriction control apparatus 10 (step 3). According to this command, the restriction control apparatus 10 ascertains that communication of a user apparatus UE belonging to a group of the M2M group ID1 should be restricted. By the way, as described before, for example, the restriction control apparatus 10 by itself may determine that the communication of a user apparatus UE of a group corresponding to the M2M group ID1 should be restricted by detecting increase of amount of signals (example: signal amount becomes equal to or greater than a threshold, and the like) from user apparatuses UE of the group corresponding to the M2M group ID1.

After that, a communication request is transmitted from a user apparatus UE1 of the user A belonging to the M2M group ID1, so that the restriction control apparatus 10 receives the communication request. The communication request includes a user ID of the user A. The restriction control apparatus 10 ascertains that an M2M group ID corresponding to the user ID is "1" that corresponds to the group of the restriction target based on the user information obtained in step 2, and determines to reject (restrict) the communication request (step 4). On the other hand, when the restriction control apparatus 10 receives a communication request from a user apparatus UE2 of the user B corresponding to the M2M group ID2, the restriction control apparatus 10 permits the communication request.

The above-mentioned user ID is an ID (example: IMSI) stored in a SIM in the user apparatus UE, for example. Since a user apparatus UE that is a target for restricting communication can be identified by the user ID, the user ID can be also called terminal identification information.

Also, the "communication request" may by any request as long as the request can cause the restriction control apparatus 10 to return, as a response, a reject response forcing the user apparatus UE to give up communication thereafter. Although the "communication request" is not limited to a specific request, the "communication request" is, for example, a signaling request such as Attach Request, RAU Request/TAU Request, Service Request and the like.

Also, in the case of a communication request related to initial attach, residing location move and the like by the user apparatus UE, it is considered that there is not the user information (correspondence information between the user ID and the M2M group ID) in the restriction control apparatus 10. In such a case, the restriction control apparatus 10 performs determination of necessity of restriction after obtaining the user information from the user information management apparatus 30.

<Process Sequence>

Figure 3:
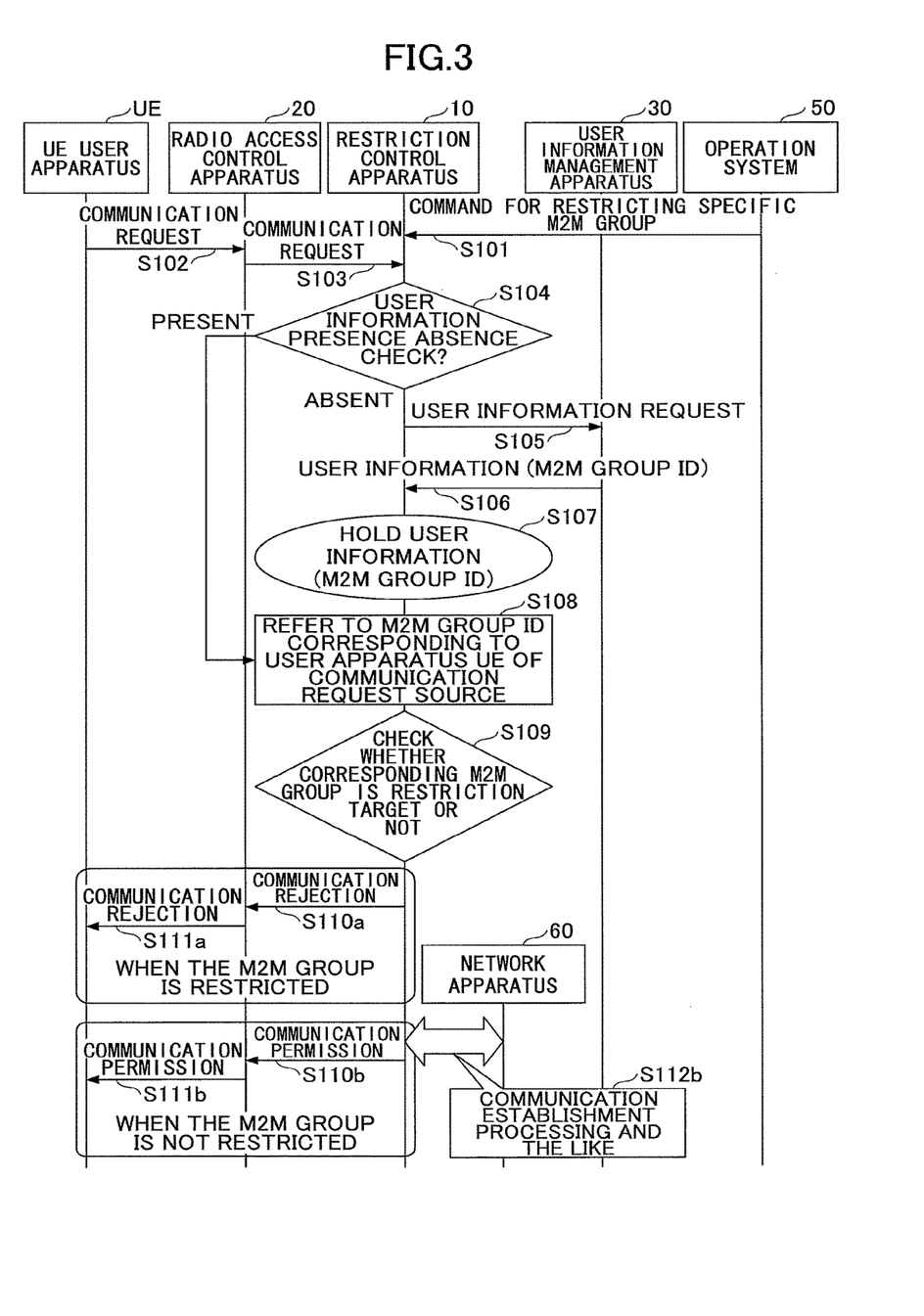
FIG. 3 is a process sequence diagram according to one or more embodiments of the first example.

Next, an example of a process sequence in one or more embodiments of the first example is described with reference to FIG. 3. As shown in FIG. 3, a command for restricting a specific M2M group is transmitted from the operation system 50 to the restriction control apparatus 10 (step 101). The command includes an M2M group ID of a restriction target.

After that, a communication request is transmitted from the user apparatus UE, and the communication request arrives at the restriction control apparatus 10 via the radio access control apparatus 20 (step 102, 103). The communication request is an Attach Request, for example. Also, the communication request includes a user ID. In the following description of the sequence, this user ID is user ID1.

The restriction control apparatus 10 that has received the communication request checks whether it holds user information on the user apparatus UE of the transmission source of the communication request (user information corresponding to the user ID1) (step 104). When the restriction control apparatus 10 does not hold the user information, the restriction control apparatus 10 transmits a user information request (including the user ID1) to the user information management apparatus 30 for requesting the user information corresponding to the user ID1 (step 105), and receives the user information as a response (step 106). The user information request is Update Location Request (ULR), for example, and the response is Update Location Answer (ULA), for example.

The restriction control apparatus 10 holds (cashes) the user information (including M2M group ID) received from the user information management apparatus 30 (step 107).

When determining that the user information is held in step 104, or, following step 107, the restriction control apparatus 10 refers to the M2M group ID corresponding to the user apparatus UE of the communication request source (that is, corresponding to the user ID1) (step 108), and determines whether the M2M group ID corresponds to an M2M group ID designated from the operation system 50 as a restriction target so as to determine whether the M2M group to which the user apparatus UE belongs is a restriction target or not (step 109).

In the case where the M2M group is a restriction target, the restriction control apparatus 10 returns a communication rejection as a response to the communication request (step 110*a*). The communication rejection arrives at the user apparatus UE via the radio access control apparatus 20 (step 110*a*, step 111*a*). After that, the user apparatus UE that receives the communication rejection does not perform retransmission of a communication request. Operation of the user apparatus UE that receives the communication rejection depends on implementation, so the operation not to perform retransmission of the communication request is an implementation example. For example, in the case where the communication request is an Attach Request, the communication rejection is an Attach Reject.

In the case where the M2M group that the user apparatus UE belongs to is not a restriction target, the restriction control apparatus 10 returns a communication permission as a response to the communication request (step 110*b*). The communication permission arrives at the user apparatus UE via the radio access control apparatus 20 (step 110*b*, step 111*b*). The user apparatus UE that receives the communication permission continues to perform communication processing. Also, the restriction control apparatus 10 performs communication establishment processing (attach and the like) with a network apparatus 60 (example: GGSNSGW) according to a bearer and a procedure and the like (step 112*b*). For example, in a case where the communication request is an Attach Request, the communication permission is an Attach Accept.

By the way, although all communications of a group that is determined to be a restriction target are rejected in the above-mentioned example, this is merely an example. Restriction control may be performed in accordance with a predetermined rule. For example, it is possible to perform restriction control in which, each M2M group ID is provided with a priority, and as to a group determined to be a restriction target, a group of low priority is rejected 100%, and the ratio of rejection is decreased for a group of high priority.

<Apparatus Configuration Example, Process Flow>

Figure 4:
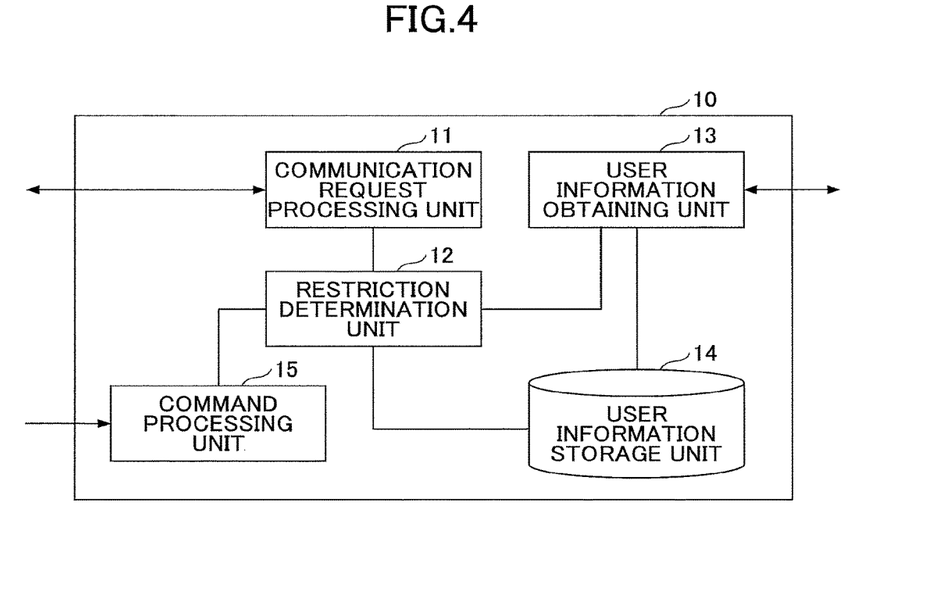
FIG. 4 is a functional block diagram of a restriction control apparatus 10 according to one or more embodiments of the present invention.

FIG. 4 shows a functional block diagram of the restriction control apparatus 10 according to one or more embodiments of the first example. As shown in FIG. 4, the restriction control apparatus 10 includes a communication request processing unit 11, a restriction determination unit 12, a user information obtaining unit 13, a user information storage unit 14 and a command processing unit 15. By the way, FIG. 4 only shows functional units especially related to one or more embodiments of the present invention in the restriction control apparatus 10.

The communication request processing unit 11 performs processes such as receiving a communication request from a user apparatus UE, passing the communication request to the restriction determination unit 12, and returning a communication rejection or a communication permission to the user apparatus UE based on the determination result by the restriction determination unit 12. The restriction determination unit 12 obtains an M2M group ID from user information in the user information storage unit 13 based on a user ID included in a communication request received from the user apparatus UE, and determines whether to perform restriction (whether to reject communication or not) based on the M2M group ID.

The command processing unit 15 performs processes such as receiving a command designating an M2M group ID of a restriction target from the operation system 15, holding the M2M group ID included in the command in storage means such as a memory, for example, and notifying the restriction determination unit 12 that the M2M group ID is an ID of an M2M group of a restriction target.

The user information obtaining unit 13 obtains user information from the user information management apparatus 30 by transmitting a user information request to the user information management apparatus 30 so as to store the user information in the user information storage unit 14.

Figure 5:
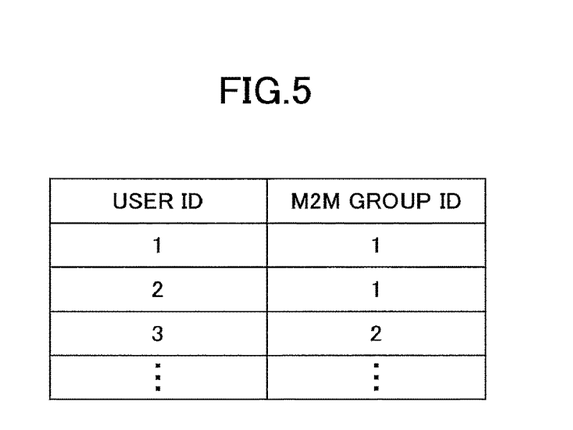
FIG. 5 is a diagram showing an example of information stored in a user information storage unit 14 according to one or more embodiments of the present invention.

FIG. 5 shows an example of user information stored in the user information storage unit 14 according to one or more embodiments of the present invention. As shown in FIG. 5, information in which a user ID is associated with an M2M group ID is stored in the user information storage unit 14 as user information. The number of users (the number of user apparatuses) in one group is arbitrary, and it may be 1, for example. Also, by assigning a plurality of types of M2M group IDs to a user ID, an M2M group ID to be referred to may be changed according to a type of a communication request.

Figure 6:
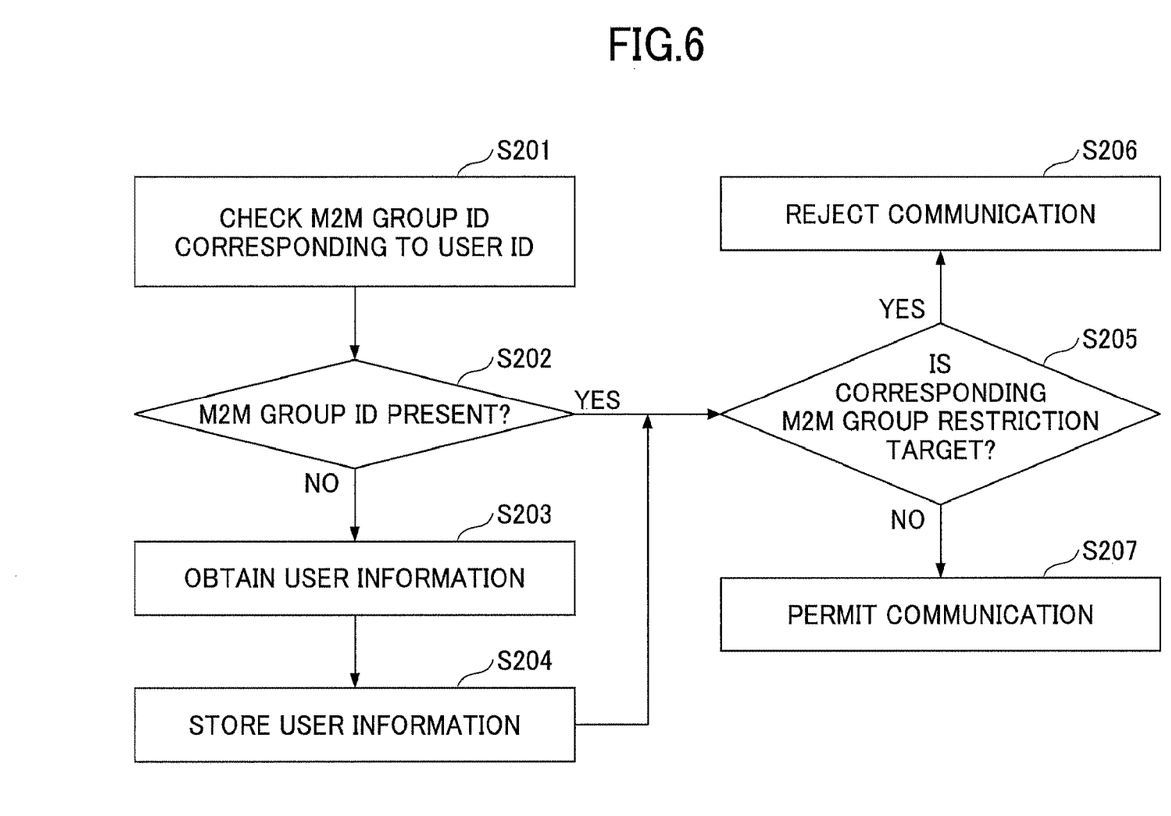
FIG. 6 is a flowchart for explaining an operation example of the restriction control apparatus 10 according to one or more embodiments of the present invention.

FIG. 6 shows a flowchart for explaining an operation example of the restriction control apparatus 10 according to one or more embodiments of the present invention. FIG. 6 shows operation after receiving a communication request from the user apparatus UE.

The restriction determination unit 12 of the restriction control apparatus 10 that receives the communication request identifies an M2M group ID corresponding to a user ID included in the communication request by referring to the user information storage unit 14 (step 201).

When the user information storage unit 14 does not hold the M2M group ID (No in step 202), the user information obtaining unit 13 of the restriction control apparatus 10 obtains user information including the M2M group ID from the user information management apparatus 30 (step 203), and stores the user information in the user information storage unit 14 (step 204).

On the other hand, when the user information storage unit 14 holds the M2M group ID (Yes in step 202), the restriction determination unit 12 checks whether the M2M group ID corresponds to an M2M group ID designated as a restriction target from the operation system 50 so as to determine whether the M2M group to which the user apparatus UE belongs is a restriction target (step 205).

When the M2M group to which the user apparatus UE belongs is a restriction target (Yes in step 205), the communication request processing unit 11 of the restriction control apparatus 10 returns a communication rejection to the user apparatus UE (step 206). When the M2M group to which the user apparatus UE belongs is not a restriction target (No in step 205), the communication request processing unit 11 of the restriction control apparatus 10 returns a communication permission to the user apparatus UE (step 207).

The restriction control apparatus 10 in the present embodiments can be realized by causing one or a plurality of computers to execute a program which describes process content described in the present embodiments. That is, the function of restriction control apparatus 10 can be realized by executing a program corresponding to processes performed by the restriction control apparatus 10 by using hardware resources such as a CPU, memory and hard disk and the like in the computer. The program can be saved and distributed by recording the program in a computer readable recording medium (such as portable memory). Also, the program can be provided via a network such as the Internet, an electronic mail and the like.

Also, the functional configuration of the restriction control apparatus 10 is not limited to the above-mentioned one. For example, the restriction control apparatus 10 may be configured as a restriction control apparatus configured to perform restriction control of communication of a user apparatus in a mobile communication system, including:

an information obtaining unit configured to obtain, from a user information management apparatus in the mobile communication system, group identification information indicating a group to which the user apparatus belongs; and a restriction determination unit configured, when receiving a communication request from the user apparatus, to determine whether the group to which the user apparatus belongs is a control target or not based on the group identification information and group identification information of a control target designated from an operation system.

The restriction control apparatus may include a communication request processing unit configured, when the group to which the user apparatus belongs is determined to be a control target by the restriction determination unit, to reject the communication request or to perform restriction control according to a predetermined rule.

Also, the restriction control apparatus may include a user information storage unit configured to store group identification information and user identification information by associating them with each other, and wherein the restriction determination unit obtains the group identification information from the user information storage unit based on user identification information included in the communication request, and determines whether the group to which the user apparatus belongs is a control target or not based on the group identification information and group identification information of a control target designated from the operation system.

According to the configuration described in the present invention, for example, in a case where failure occurs in a server apparatus for M2M so that packet origination and attach are repeated in user apparatuses that access the server apparatus, it becomes possible to perform flexible restriction control for the user apparatus irrespective of whether the user apparatus supports LAPI or not, such as, to control only the user apparatuses, or to select users subscribing A company as restriction targets, but not to select others (B, C, D companies) as restriction targets.

Second Example

Next, one or more embodiments of the second example is described. In one or more embodiments of the second example, each user is assigned an M2M group ID, the user apparatus UE holds the M2M group ID, the user apparatus UE transmits a connection request including the M2M group ID to the radio access control apparatus 20 when establishing a radio connection with the radio access control apparatus 20, so that the radio access control apparatus 20 performs restriction determination based on the M2M group ID. In one or more embodiments, although it is not necessary that the user information management apparatus 30 has M2M group IDs for the purpose of restriction control, the M2M group IDs may be held. However, the customer system 40 or the operation system 50 holds information in which a user ID (arbitrary ID for identifying user or user apparatus UE) is associated with an M2M group ID for the purpose of determining which user apparatus UE to select as a restriction target.

The M2M group ID in one or more embodiments may be information recorded in a SIM set to a user apparatus UE, may be information set to the user apparatus UE in a fixed manner, may be information set to the user apparatus UE from the network, or may be information set in other way.

Figure 7:
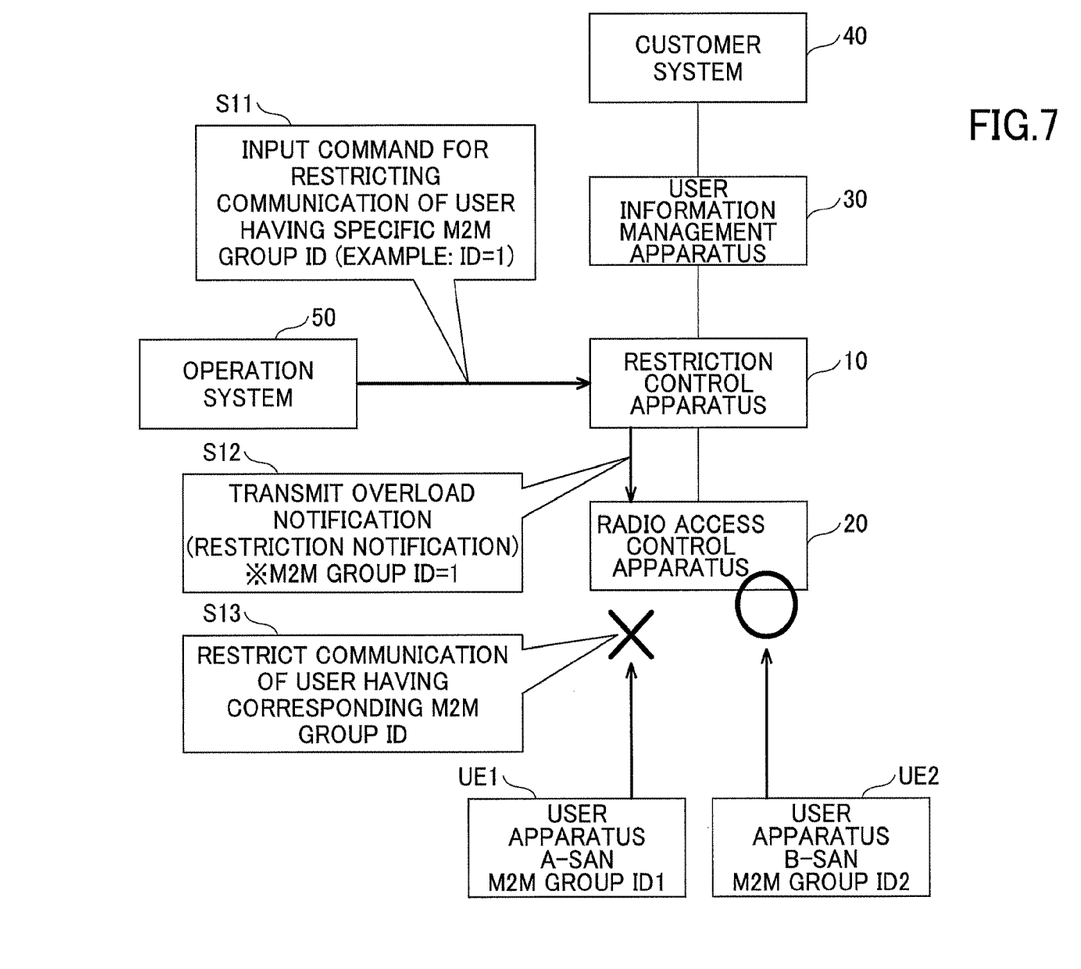
FIG. 7 is a diagram for explaining outline of processes according to one or more embodiments of a second example of the present invention.

Outline of processing in one or more embodiments of the second example is described with reference to FIG. 7. As shown in FIG. 7, the user apparatus UE1 holds M2M group ID1, and the user apparatus UE2 holds M2M group ID2.

For example, in a situation in which a server apparatus accessed by user apparatuses UE of a group is failed, the operation system 50 detects the event, and determines to restrict communication of user apparatuses UE belonging to the group (as an example, M2M group ID=1). Then, a command including the M2M group ID1 of a restriction target is transmitted from the operation system 50 to the restriction control apparatus 10 (step 11).

Next, the restriction control apparatus 10 transmits, to the radio access control apparatus 20, a restriction notification (including the M2M group ID1) for notifying of performing restriction to a group of the M2M group ID1 (step 12). By the restriction notification (restriction information), the restriction control apparatus 10 can ascertain that communication of a user apparatus UE corresponding to the M2M group ID1 should be restricted.

After that, a connection request including the M2M group ID1 is transmitted from the user apparatus UE1 holding the M2M group ID1, and the radio access control apparatus 20 receives the connection request. The radio access control apparatus 20 ascertains that the M2M group ID1 is a restriction target based on the restriction information obtained in step 12 so as to determine to reject (restrict) the connection request (step 13). On the other hand, when the radio access control apparatus 20 receives a connection request including the M2M group ID2 from the user apparatus UE2, the radio access control apparatus 20 determines not to perform restriction and permits connections.

The connection request is an RRC Connection Request, for example. But, the connection request is not limited to this. The connection request may be any request as long as it can cause the radio access control apparatus 20 to return a response rejecting communication processing thereafter.

<Process Sequence>

Next, an example of a process sequence in one or more embodiments of the second example is described with reference to FIG. 8. In the example shown in FIG. 8, first, priority information for each M2M group ID is transmitted from the operation system 50 to the restriction control apparatus 10 (step 301). For example, information is transmitted indicating that priority of the M2M group ID1 is 1 (high priority) and that priority of the M2M group ID2 is 9 (low priority). In one or more embodiments, the higher the priority is, the more hardly it is restricted when congestion occurs.

Also, in the present example, the restriction control apparatus 10 includes a function for ascertaining load of a circuit of a network, a network apparatus, a server apparatus that becomes a communication partner of the user apparatus UE and the like, and determining that congestion occurs when the load exceeds a predetermined value so as to determine to restrict communication of the user apparatus UE.

Here, it is assumed that the restriction control apparatus 10 determines that congestion occurs, and determines to restrict communication of the user apparatus UE. The restriction control apparatus 10 determines up to which level of priority of M2M groups from low priority to restrict, and notifies the radio access control apparatus 20 of M2M group IDs of the M2M groups determined to be restricted as a restriction target (step 303).

The radio access control apparatus 20 receives a connection request (including a M2M group ID) from the user apparatus UE (step 304). The radio access control apparatus 20 determines whether to permit connection from the user apparatus UE by determining that the M2M group ID of the connection request source included in the connection request corresponds to an M2M group ID of the restriction target (step 305).

When the M2M group ID of the connection request source is a restriction target (Yes in step 305), the radio access control apparatus 20 returns a connection rejection to the user apparatus UE (step 306). When the M2M group ID of the connection request source is not a restriction target (No in step 305), communication processing continues (step 307). The connection rejection is an RRC Connection Reject, for example.

<Apparatus Configuration>

Figure 9:
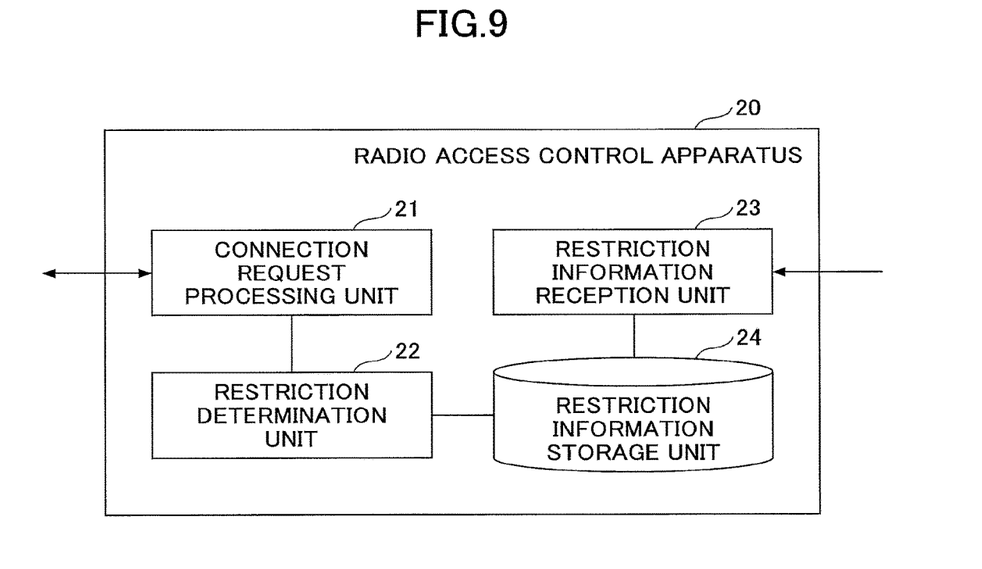
FIG. 9 is a functional block diagram of a radio access control apparatus 20 according to one or more embodiments of the second example.

FIG. 9 shows a block diagram of the radio access control apparatus 20 according to one or more embodiments of the present invention. As shown in FIG. 9, the radio access control apparatus 20 includes a connection request processing unit 21, a restriction determination unit 22, a restriction information reception unit 23, and a restriction information storage unit 24. By the way, FIG. 9 only shows functional units especially related to one or more embodiments of the present invention in the radio access control apparatus 20.

The connection request processing unit 21 receives a connection request from the user apparatus UE, passes the received connection request to the restriction deamination unit 22, and performs processing of connection rejection or connection continuation based on the determination result by the restriction determination unit 22.

The restriction determination unit 22 determines whether to perform restriction (whether to reject connection) by determining whether the M2M group ID included in the connection request received from the user apparatus UE corresponds to an M2M group ID of a restriction target stored in the restriction information storage unit 24.

The restriction information reception unit 23 receives restriction information designating an M2M group ID of a restriction target, and stores the restriction information in the restriction information storage unit 24.

Figure 8:
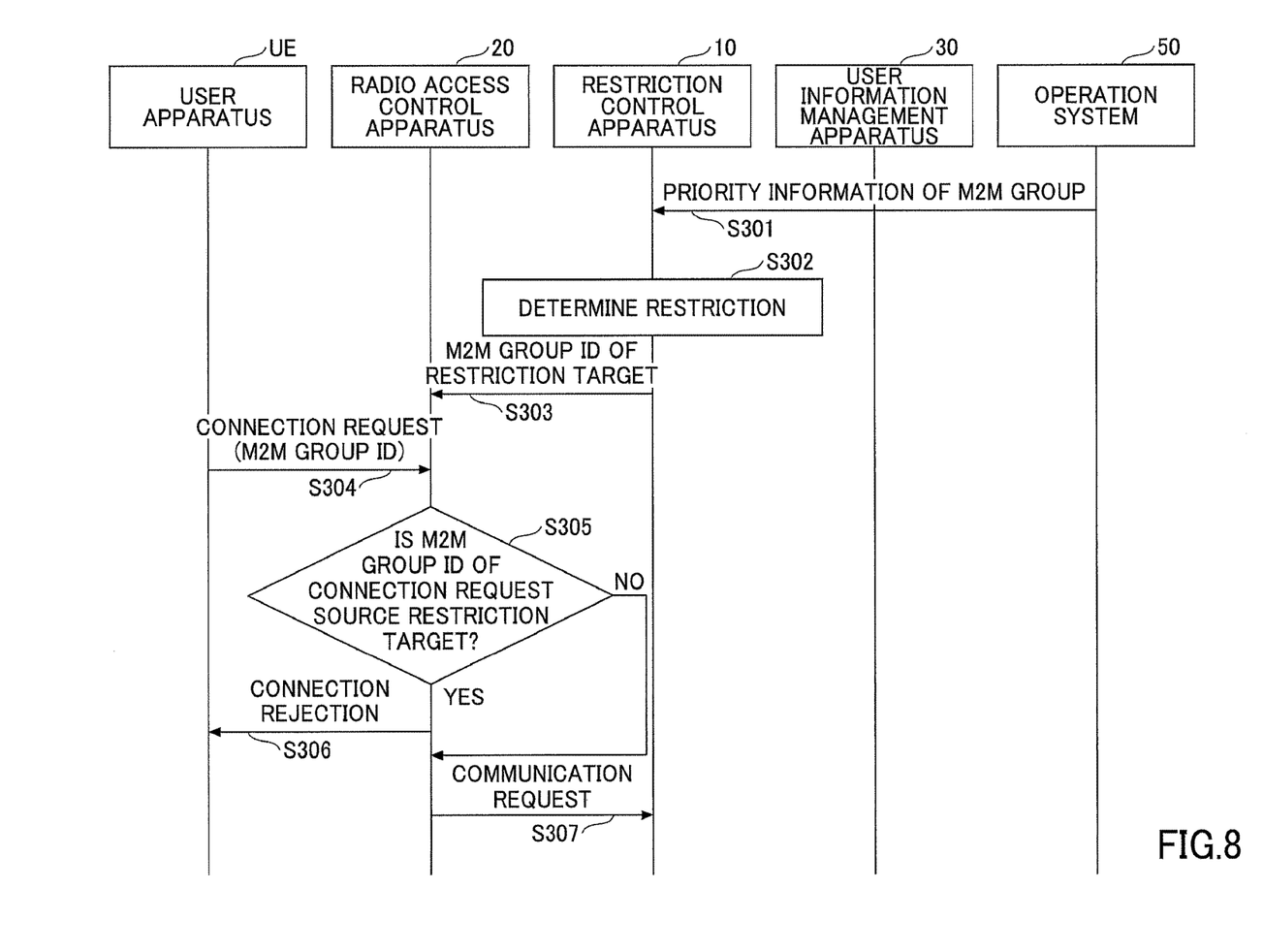
FIG. 8 is a process sequence diagram according to one or more embodiments of the second example.

The process flow of the radio access control apparatus 20 is as shown in FIG. 8. That is, the restriction information reception unit 23 of the radio access control apparatus 20 receives an M2M group ID of a restriction target from the restriction control apparatus 10 (step 303). When the radio access control apparatus 20 receives a connection request (including an M2M group ID) from the user apparatus UE (step 304), the restriction determination unit 22 determines whether the M2M group ID of the connection request source corresponds to an M2M group ID of the restriction target (step 305). When the M2M group ID of the connection request source is the restriction target (Yes in step 305), the connection request processing unit 21 of the radio access control apparatus 20 returns a connection rejection to the user apparatus UE (step 306). When the M2M group ID of the connection request source is not the restriction target (No in step 305), communication processing continues (step 307).

Also in one or more embodiments of the second example, like the first example, for example, in a case where failure occurs in a server apparatus for M2M so that packet origination and attach are repeated in user apparatuses that access the server apparatus, it becomes possible to perform flexible restriction control for the user apparatus irrespective of whether the user apparatus supports LAPI or not, such as, to control only the user apparatuses, or to select users subscribing A company as restriction targets, but not to select others (B, C, D companies) as restriction targets. Also, in one or more embodiments, since the radio access control apparatus 20 performs restriction, it is possible to perform restriction in units of group in an RRC level, for example.

Combination of First Example and Second Example

Although the first example and the second example have been described separately so far, the communication system shown in FIG. 1 may have functions of both of the function of the first example and the function of the second example.

In this case, for a user apparatus UE that does not have an M2M group ID, restriction control can be performed by the method described in the first example. Also, for a user apparatus UE that has an M2M group ID, restriction control may be performed by the method described in the second example, or may be performed by the method described in the first example.

In the combination of the first example and the second example, for example, there is provided a restriction control system including the restriction control apparatus 10 in the first example and the radio access control apparatus 20 in the second example.

The user apparatus UE described in one or more embodiments may include a CPU and a memory and may be realized by executing a program by the CPU (processor), or may be realized by hardware such as hardware circuits including logics of processing described in one or more embodiments, or may be configured by coexistence of a program and hardware.

The radio access control apparatus 20 described in one or more embodiments may include a CPU and a memory and may be realized by executing a program by the CPU (processor), or may be realized by hardware such as hardware circuits including logics of processing described in one or more embodiments, or may be configured by coexistence of a program and hardware.

The restriction control apparatus 10 described in one or more embodiments may include a CPU and a memory and may be realized by executing a program by the CPU (processor), or may be realized by hardware such as hardware circuits including logics of processing described in one or more embodiments, or may be configured by coexistence of a program and hardware.

In the above, one or more embodiments of the present invention have been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the restriction control apparatus and the radio access control apparatus have been explained by using functional block diagrams. However, such an apparatus may be implemented in hardware, software, or a combination thereof.

The software executed by a processor provided in the restriction control apparatus according to one or more embodiments of the present invention and the software executed by a processor provided in the radio access control apparatus may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiments and is intended to include various variations, modifications, alterations, substitutions and so on without departing from the spirit of the present invention. Accordingly, the scope of the invention should be limited only by the attached claims.

DESCRIPTION OF REFERENCE SIGNS

UE user apparatus
10 restriction control apparatus
20 radio access control apparatus
30 user information management apparatus
40 customer system
50 operation system
11 communication request processing unit
12 restriction determination unit
13 user information obtaining unit
14 user information storage unit
15 command processing unit 21 connection request processing unit
22 restriction determination unit
23 restriction information reception unit
24 restriction information storage unit

The invention claimed is:

1. A restriction control apparatus belonging to a mobile communication system including a plurality of user apparatuses and a user information management apparatus, the restriction apparatus comprising:
a receiver that receives:
first group identification information from the user information management apparatus that associates the plurality of user apparatuses into a plurality of groups;
second group identification information indicating at least one of the plurality of groups as a rejection target; and
a communication request from a Machine Type Communication (MTC) user apparatus among the plurality of user apparatuses, wherein the communication request includes user identification information associated with the MTC user apparatus; and
a memory that:
stores the first group identification information and user identification information in an associated manner;
a processor that:
obtains the first group identification information from the memory based on the user identification information in response to receiving the communication request;
determines whether a group among the plurality of groups with which the MTC user apparatus is associated is indicated as the rejection target based on the second group identification information; and
if the group is indicated as the rejection target, performs a restriction control of communication on the MTC user apparatus,
wherein the restriction control of communication comprises:
restricting communication of the MTC user apparatus based on a predetermined rule; or
rejecting the communication request,
wherein:
when receiving the communication request from the MTC user apparatus, the processor determines whether the memory stores first group identification information corresponding to the user identification information included in the communication request, and
if the memory does not store first group identification information corresponding to the user identification information included in the communication request, the processor obtains correspondence information between user identification information and first group identification from the user information management apparatus and stores the correspondence information in the memory.

2. A restriction control method in a mobile communication system that includes a restriction control apparatus, a plurality of user apparatuses, and a user information management apparatus, the method comprising:
obtaining, by the restriction control apparatus:
first group identification information from the user information management apparatus that associates the plurality of user apparatuses into a plurality of groups;
second group identification information indicating at least one of the plurality of groups as a rejection target; and
a communication request from a Machine Type Communication (MTC) user apparatus among the plurality of user apparatuses, wherein the communication request includes user identification information associated with the MTC user apparatus; and
storing, by the restriction control apparatus, the first group identification information and user identification information in an associated manner;
obtaining, by the restriction control apparatus, the stored first group identification information in response to receiving the communication request;
determining, by the restriction control apparatus, whether a group among the plurality of groups with which the MTC user apparatus is associated is indicated as the rejection target based on the second group identification information; and
performing, if the group is indicated as the rejection target and by the restriction control apparatus, a restriction control of communication on the MTC user apparatus,
wherein the restriction control of communication comprises:
restricting communication of the MTC user apparatus based on a predetermined rule; or
rejecting the communication request,
wherein:
when receiving the communication request from the MTC user apparatus, the restriction control apparatus checks whether the first group identification information is stored corresponding to the user identification information included in the communication request, and
if the first group identification information is not stored corresponding to the user identification information included in the communication request, the restriction apparatus obtains correspondence information between user identification information and first group identification from the user information management apparatus and stores the correspondence information.

* * * * *